(No Model.)

R. M. KEATING.
CRANK SHAFT AND BEARING FOR BICYCLES, &c.

No. 568,768. Patented Oct. 6, 1896.

Witnesses
L. H. Storner
E. C. Stickney.

Inventor
Robert M. Keating
By Allen Webster
Attorney

UNITED STATES PATENT OFFICE.

ROBERT M. KEATING, OF SPRINGFIELD, MASSACHUSETTS.

CRANK-SHAFT AND BEARING FOR BICYCLES, &c.

SPECIFICATION forming part of Letters Patent No. 568,768, dated October 6, 1896.

Application filed June 1, 1896. Serial No. 593,733. (No model.)

*To all whom it may concern:*

Be it known that I, ROBERT M. KEATING, a citizen of the United States of America, residing in Springfield, in the county of Hampden and State of Massachusetts, have invented new and useful Improvements in Crank-Shafts and Bearings for Bicycles and other Like Vehicles, of which the following is a specification, reference being had to the accompanying drawings, and letters of reference marked thereon, in which drawings like letters of reference indicate like parts.

Figure 1:
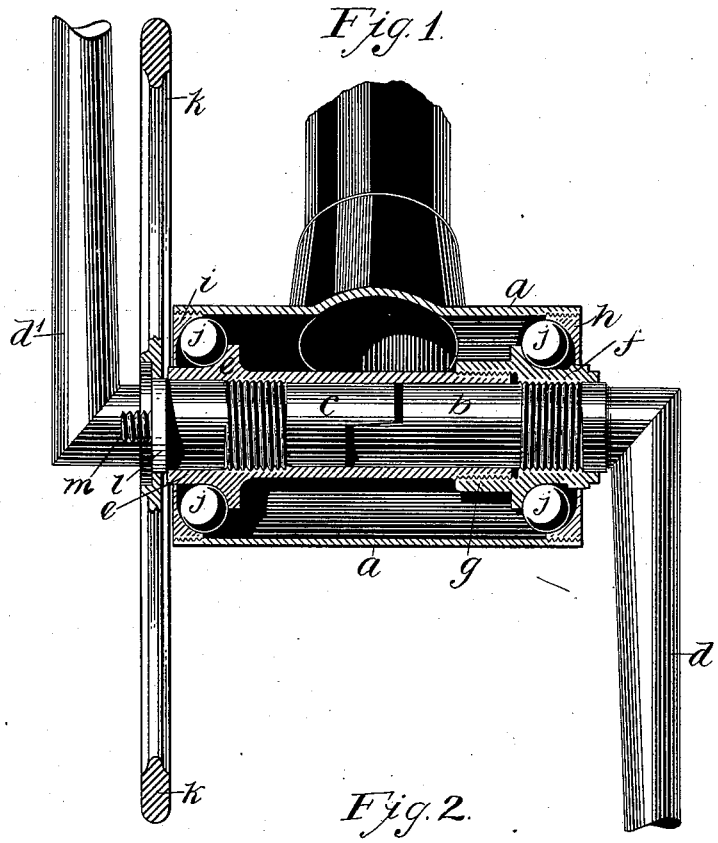
Figure 2:
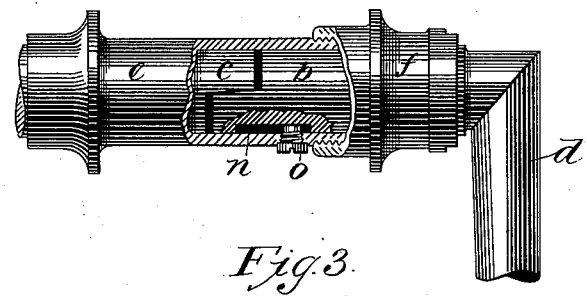
Figure 3:
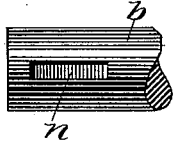

Figure 1 is a longitudinal view of my device with a part in section. Fig. 2 is a longitudinal view of a portion thereof detached from the hanger, a part being in section and illustrating a modification; and Fig. 3 is a detached view of a section of one of the crank-shafts.

In detail, $a$ indicates the bracket; $b$ and $c$, crank-shaft sections; $d$, crank-arms; $e$, a tubular sleeve interiorly threaded adjacent to one end and exteriorly threaded at the opposite end and having a cone-bearing formed at one end thereof; $f$, a short sleeve interiorly threaded and having an extension $g$, threaded to engage the exterior thread upon the sleeve $e$; $h$ and $i$, bearing-rings mounted in the bracket; $j$, balls; $k$, sprocket-wheel; $l$, a plate to which the sprocket-wheel is secured; $m$, screws or bolts adapted to hold the sprocket-wheel in position upon the plate; $n$, a recess in the crank-shaft section $b$, and $o$ a screw passing through the sleeve and into the recess $n$.

The construction and operation of my device will be readily understood on reference to the drawings, wherein I show, in Fig. 1, a crank-bracket provided at each end with ball-bearing rings $h$ and $i$. The crank-shaft is formed in two sections $b$ and $c$, the end portions being adapted to interlock, so that when in position neither shaft-section is free to revolve independently. The shaft-section $c$ is provided with a threaded portion, as shown in Fig. 1, and the shaft-section $b$ is provided with a like threaded portion, except that the thread runs in the opposite direction and the threaded portion is located, preferably, more nearly adjacent to the crank-arm. A sleeve $e$ has formed upon it at one end a cone-bearing, the same being preferably integral with the sleeve, and the sleeve is at the opposite end exteriorly threaded, and is also at a point adjacent to the cone-bearing part interiorly threaded to engage the thread upon the shaft-section $c$, the length of this sleeve being sufficient to extend beyond the junction of the end portions of the shaft-sections and to a point where the exterior thread upon its end portion will engage the interior thread upon the extension $g$ of the part $f$. The short sleeve $f$ is interiorly threaded to engage the thread upon the shaft-section $b$, and the extension $g$ thereof is interiorly threaded to engage the thread upon the end of the sleeve $e$.

The shaft-section $b$ is preferably provided with a groove or recess $n$, and the sleeve $e$ is provided with a thread-opening into which fits a screw $o$, the end portion of which enters the recess $n$. The recess being of such length that while permitting the separation of the end portions of the shaft-sections by the turning of the short sleeve $f$ it will not permit the shaft-section $b$ to be removed from the sleeve, but will operate to prevent rotation of the shaft-section $b$ independently of the sleeve $e$, and after the end portions of the shaft-sections have been separated sufficiently to permit the rotation of the shaft-section $b$ and sleeve $e$ independently of the shaft-section $c$ the sleeve and shaft-section $b$ may be rotated together while the shaft-section $c$ remains at rest, or the shaft-section $c$ may be rotated while the shaft-section $b$ and sleeve $e$ remain at rest, thus in either event causing the separation of the sleeve and shaft-section $c$.

If the device be in position as indicated in Fig. 1, and it be desired to separate the parts, it is accomplished by first removing the ring-bearing piece $h$ by the employment of a spanner in the well-known manner, removal of the balls at that end of the bearing turning the cone-bearing piece $f$ by the application of a wrench, thus causing the separation of the long and short sleeves and at the same time drawing the shaft-section $b$ away from the shaft-section $c$ until the interlocking end portions of the shaft-sections are separated sufficiently so that one shaft-section may be revolved independently of the other. Then the shaft-section $b$ is revolved, carrying with it the sleeve $e$ and causing its separation from the shaft-section $c$, the balls being freed and falling out therewith, and the shaft-section c can then be removed from the opposite end of the hanger, the ring-bearing i remaining in place. The reverse operation will of course be followed in assembling the parts.

Having therefore described my invention, what I claim as new, and desire to secure by Letters Patent, is—

1. The combination of a crank-shaft consisting of two shaft-sections the ends of which are adapted to interlock and prevent when so interlocked rotation of one without the other, a sleeve having at one end a cone-bearing integral therewith and engaging one of said shaft-sections by an interior threaded connection and provided at its opposite end with an exterior thread, a bearing-piece f having an interior thread to engage a thread on the shaft-section b and having an extension g interiorly threaded to engage the thread on the end of the sleeve e; a bracket a bearing-rings at each end thereof and balls interposed between the bearing-rings and cones, substantially as shown.

2. The combination of a crank-shaft consisting of two shaft-sections with their ends arranged to interlock and prevent rotation of the one without the other when so interlocked, a sleeve mounted by interior threaded connection on one shaft-section and extending over a portion of the other shaft-section and having a screw o mounted in and projecting through its side, the last-named shaft-section having a longitudinal slot to receive the screw end, a short sleeve f mounted on the last-named shaft-section by an interior threaded connection and engaging by threaded connection the end of the long sleeve, cone-bearings on each of said sleeves, a bracket bearing rings therein and balls arranged between the rings and cones, substantially as shown.

3. The combination of a hanger a crank-shaft section b having a thread on a part of its exterior shaft-section c having a like threaded part but in reverse direction the ends of the shaft-sections being shaped to interlock, a sleeve e having a cone-bearing at one end and an exterior thread at its opposite end, and interiorly threaded to engage the thread on the shaft-section c, means to prevent rotation of the sleeve e and section b independently of each other but permitting longitudinal movement therebetween a short sleeve f interiorly threaded to engage the thread on the shaft-section b and also threaded to engage the thread on the end of sleeve e and having an exterior cone-bearing surface, a bracket a, bearing-rings mounted in each end thereof and balls arranged between the cones and rings, substantially as shown.

ROBERT M. KEATING.

Witnesses:
ALLEN WEBSTER,
ROBERT A. KNIGHT.